May 5, 1936.  V. W. KLIESRATH  2,039,318
MOTOR VEHICLE
Filed May 15, 1933  3 Sheets-Sheet 1

INVENTOR.
Victor W. Kliesrath
BY
ATTORNEY.

May 5, 1936.     V. W. KLIESRATH     2,039,318
MOTOR VEHICLE
Filed May 15, 1933     3 Sheets-Sheet 2
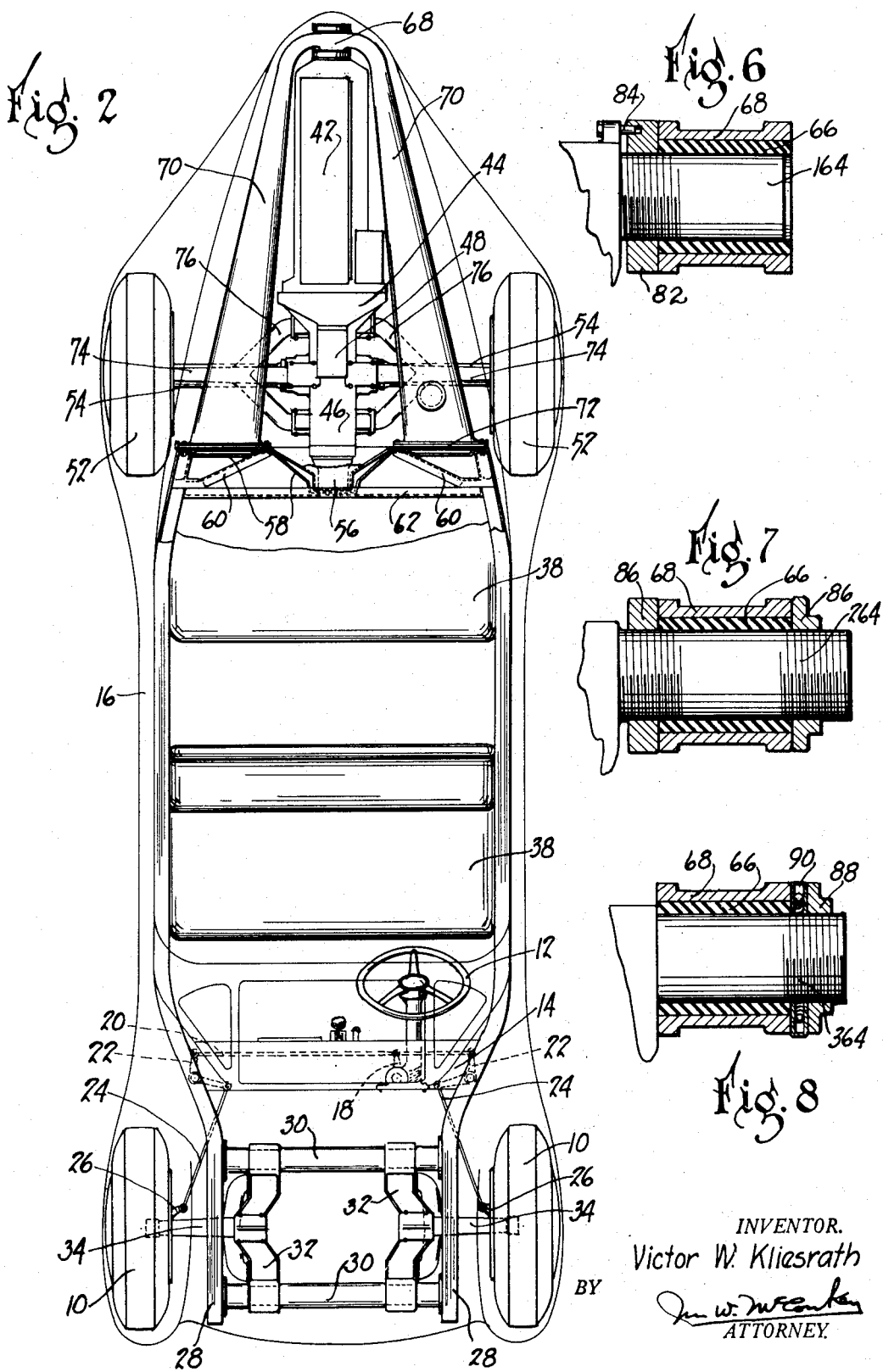
INVENTOR.
Victor W. Kliesrath
BY
ATTORNEY.

May 5, 1936.  V. W. KLIESRATH  2,039,318
MOTOR VEHICLE
Filed May 15, 1933  3 Sheets-Sheet 3
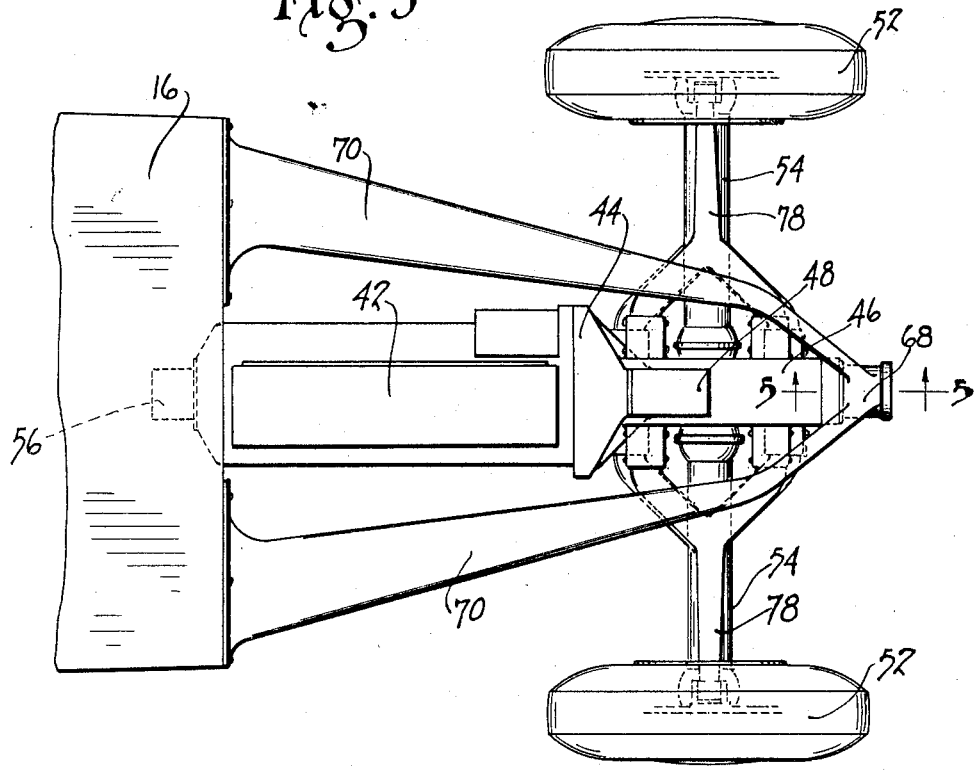
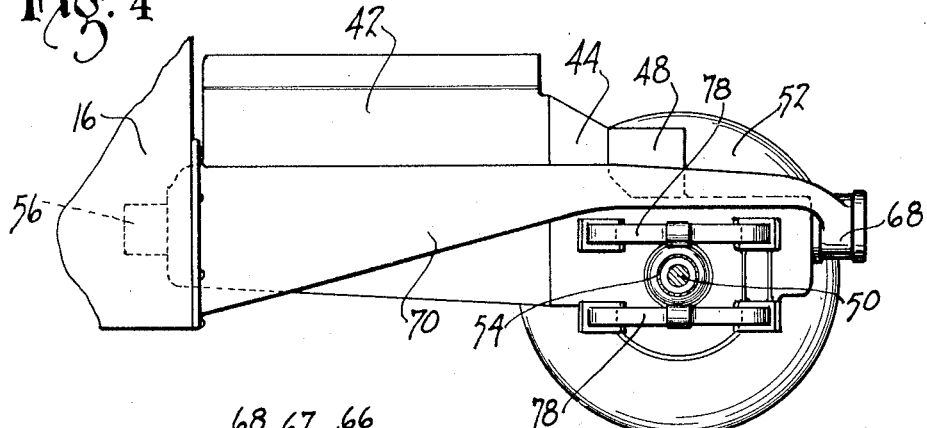
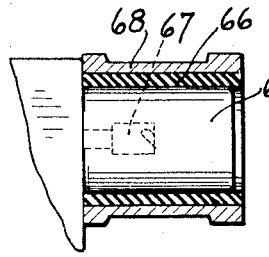
INVENTOR.
Victor W. Kliesrath
BY
ATTORNEY.

Patented May 5, 1936

2,039,318

UNITED STATES PATENT OFFICE 2,039,318

MOTOR VEHICLE

Victor W. Kliesrath, South Bend, Ind., assignor to The Steel Wheel Corporation, Chicago, Ill., a corporation of New York Application May 15, 1933, Serial No. 671,048

8 Claims. (Cl. 180—54)

This invention relates to automobiles and the like, and is illustrated as embodied in a novel automobile having a rear-mounted engine.

Among the objects of the invention are to improve vehicles of this character by providing a compact and efficient arrangement of parts, and by arranging a three-point suspension of the body on the two front wheels and the engine with the engine directly supported on the rear wheels, to provide such vehicles with individually-sprung wheels, and to transmit the engine reaction torque vibrations directly to the rear wheels and thereby eliminate their effect on the body.

In the illustrated embodiment, the engine is pivotally mounted at the rear of the chassis, for example on bearings carried by a transverse element just behind the seating means and by novel side members between which the engine is arranged and which carry the second bearing at the extreme rear end of the car. By yieldingly connecting to opposite sides of the engine axle sections or the like on which the rear wheels are journaled, I provide the desired individual springing for the wheels, and at the same time provide means transmitting the engine torque reaction vibrations directly to the wheels.

The above-described arrangement also provides a three-point suspension for the vehicle body, since its front end is supported on opposite sides by the front wheels, and its rear end is centrally pivoted on the engine which in turn is yieldingly supported on the rear wheels.

I prefer to arrange the engine as part of a unit power plant containing also a transmission, compactly arranged with the engine on one side and the transmission on the other side of the differential which is arranged between the rear wheels and drivably connected to the rear wheels. The differential may also be built into the unit power plant if desired. Placing the transmission forwardly of the differential simplifies the arrangement of the controls, but there are other advantages which can be secured with the reverse arrangement with the engine ahead of and the transmission behind the differential.

Other objects and features of the invention including various novel combinations of parts and desirable particular arrangements and constructions, will be apparent from the following description of the illustrative embodiment shown in the accompanying drawings, in which:

Figure 2 is a horizontal section through the automobile, showing in plan the engine and its mounting;

Figure 3 is a partial horizontal section corresponding to the upper portion of Figure 2, but showing a modified arrangement;

Figure 4 is a partial vertical section corresponding to the right hand portion of Figure 1, but showing the modification of Figure 3; and Figures 5, 6, 7, and 8 are sections showing different forms of bearings for pivotally supporting the end of the engine.

Figure 1:
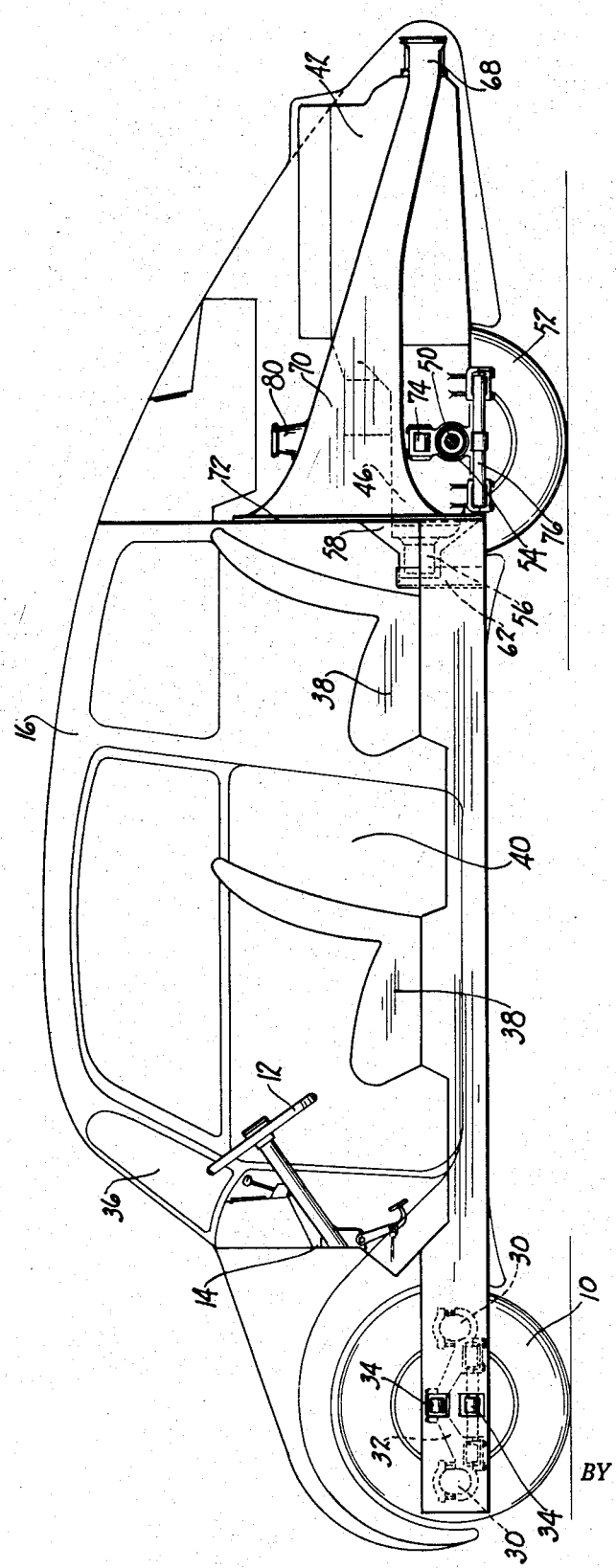
Figure 1 is a diagrammatic longitudinal section through an automobile embodying the invention.

In the arrangement shown in Figures 1 and 2, the automobile has dirigible front wheels 10 controlled by a steering wheel 12 associated (with other controls) with a transverse dash 14 forming a part of or other wise associated with a novel streamlined body 16 having its front end yieldingly supported at opposite sides by the dirigible front wheels 10. In the arrangement shown, the steering wheel 12 operates a rock lever 18 which moves a thrust link 20 in opposite directions lengthwise, the thrust link 20 being connected to bellcrank levers 22 arranged at opposite sides of the car and which are connected by means such as steering links 24 to steering arms 26 which control the swiveling of the wheels.

The body 16, or a frame or base supporting it, includes side frame members 28 projecting forwardly of the dash, and connected by parallel cross members 30. Members 30 have mounted thereon brackets 32 formed (as explained in my application No. 651,821, filed January 14, 1933) with sockets containing rubber blocks embracing the ends of axle sections 34 at the outer ends of which the wheels 10 are swiveled. As shown in Figure 1, and as more fully explained in my said prior application, the upper axle sections 34 may be straight, while the lower ones are Y-shaped in plan to brace the wheels against twisting strains.

The body is provided with an inclined windshield 36, and with a seat or seats 38, and doors 40 shown as wide enough to afford access to both front and rear seats. Immediately behind the rear seat is arranged a unit power plant including an engine 42 having a clutch in an associated bellhousing 44, and also including a transmission 46.

The power plant unit also preferably includes a differential, of any desired type, in an intermediate housing 48. The engine is on one side of the differential and the transmission on the other. The mechanical details of these parts may be as fully described in my above-mentioned prior application. The differential is drivably connected, through axle shafts 50 and suitable universal joints, with the rear wheels 52. The axle shafts 50 may be protected by jointed tubular housings 54.

In the arrangement of Figures 1 and 2, the engine is shown behind the differential and the transmission ahead of it, an arrangement which facilitates laying out the controls. In Figures 3 and 4 is shown the reverse arrangement, with the engine ahead of the differential and the transmission behind it.

The front end of the power plant or engine is in the form of a cylindrical boss 56 sleeved within, and exteriorly vulcanized or otherwise bonded to, a rubber yielding bushing seated in and similarly bonded to a cylindrical bearing formed centrally of a transverse element such as a stamped steel plate 58 braced by inclined bracket members 60 and peripherally secured to the rear ends of frame members 28, or to other integral parts of the chassis. The central bearing so formed may also be braced and supported by the central portion of another transverse element 62 shown as secured between the frame members 28.

The rear end of the engine or power plant is in the form of a hollow boss 64 (Figure 5), surrounding the handcrank clutch element 67 which is used in cranking the engine by hand. The boss 64 is sleeved within, and exteriorly vulcanized or otherwise bonded to a yielding rubber bushing 66 which in turn is embraced by and similarly bonded to a bearing 68 which forms a connection between two side arms 70 between which the engine is arranged.

The arms 70 are preferably hollow drawn steel stampings of flaring generally-conical form, and with the larger forward ends formed over as flanges seated over the opposite sides of the stamping 58 and bolted or otherwise secured to that stamping and to the braces 60 and the ends of the frame members 28. There is preferably also an intermediate plate 72, having a central opening cut away for the central conical and bearing portion of stamping 58, and which extends the full height of the body just behind the rear seat, to serve as a partition between the passenger space and the engine compartment. Any desired form of removable engine hood may be mounted on the arms 70.

As the above-described front and rear bearings for the engine are in coaxial alinement with each other, and preferably also with the engine crankshaft, it will be seen that the engine reaction torque vibrations allow the engine to oscillate freely, with motions cushioned by the rubber bushings, and that these vibrations are not transmitted to the body at all. It will also be seen that the rear end of the body is pivotally supported by the engine, which therefore cooperates with the front wheels to form a three-point suspension for the body.

The engine reaction vibrations are transmitted directly to the driven rear wheels 52 by novel means which preferably also serves as an individual spring suspension for the two wheels. As illustrated, this means includes straight upper axle sections 74 and Y-shaped lower sections 76 having their inner ends mounted between rubber blocks in sockets in the engine casing, and having the wheels 52 journaled at their outer ends, as explained in my above-mentioned prior application No. 651,821. In the form of Figures 3 and 4, both upper and lower axle sections 78 are Y-shaped in plan.

Since the arms 70 are hollow, they may be additionally utilized to form the fuel tank, and to that end provided with a filler spout 80.

In Figures 6, 7, and 8 are shown means for adjusting one (or both) of the engine bearings or supports. In Figure 6, a nut 82 is threaded on the base of the boss 164, against the bearing 68 and bushing 66, and locked in adjusted position by a locking pin or the like 84. In Figure 7, two nuts 86 are threaded on boss 264 against opposite ends of the bearing 68 and the bushing 66. In Figure 8 there is a single nut 88 threaded on the rear end of boss 364 and backing up a thrust ball bearing 90.

While my prior application No. 651,821 has been referred to in order to amplify the description of some of the mechanical details, and while one illustrative embodiment of the invention has been described in detail, it is not my intention to claim herein any of the subject-matter of said prior application, or to limit the scope of the invention to the particular embodiment illustrated or otherwise than by the terms of the appended claims.

I claim:

1. A motor vehicle having dirigible front wheels and driven rear wheels and a chassis member carried thereby, said chassis member including a transverse element in a vertical plane near the rear wheels and provided with a bearing device substantially at its center, and also including side members extending rearwardly from said transverse element and supporting substantially at the rear end of the car another bearing device alined with the first bearing device, and in combination with an engine pivotally supported by said bearing devices and driving the rear wheels and having individual spring suspension devices independently yieldingly connecting it to said rear wheels.

2. A motor vehicle having dirigible front wheels and driven rear wheels and a chassis member carried thereby, said chassis member including a transverse element near the rear wheels and provided with a bearing device substantially at its center, and also including side members extending rearwardly from said transverse element and supporting substantially at the rear end of the car another bearing device alined with the first bearing device, and in combination with an engine pivotally supported by said bearing devices and driving the rear wheels, and individual spring suspension means for yieldingly supporting the engine directly from said rear wheels whereby the rear end of the chassis member is supported by said wheels through the medium of said means and the engine.

3. A motor vehicle having dirigible front wheels and driven rear wheels and a chassis member carried thereby, said chassis member including a transverse element near the rear wheels and provided with a bearing device substantially at its center, and also including side members extending rearwardly from said transverse element and supporting substantially at the rear end of the car another bearing device alined with the first bearing device, and in combination with an engine pivotally supported by said bearing devices and driving the rear wheels, and means for transmitting the torque reaction of the engine directly to said rear wheels including individual spring suspension devices for said wheels.

4. A motor vehicle having dirigible front wheels and driven rear wheels and a chassis member carried thereby, said chassis member including a transverse element near the rear wheels and provided with a bearing device substantially at its center, and also including side members extending rearwardly from said transverse element and supporting substantially at the rear end of the car another bearing device alined with the first bearing device, and in combination with an engine pivotally supported by said bearing devices and having yieldable axle sections independently connecting it to the rear wheels.

5. A motor vehicle having dirigible front wheels and driven rear wheels, in combination with an engine arranged to drive the rear wheels, and means for transmitting the engine torque reaction to said rear wheels, said means being constructed and arranged yieldingly to support the engine on said rear wheels and to permit said wheels to move independently of each other and means for mounting the engine on the vehicle for pivotal movement about a longitudinal axis the engine as so supported being arranged to carry the load of the rear end of the vehicle.

6. A vehicle having individually-sprung dirigible front wheels and individually-sprung driven rear wheels, an engine directly supported by said rear wheels, and a body having its rear end centrally pivoted on said engine and having its front end supported at opposite sides by the front wheels, the front wheels and the engine serving in effect as a three-point suspension for the body.

7. A motor vehicle comprising dirigible front wheels and driven rear wheels, a differential between and drivably connected to said rear wheels, a power plant mounted on the vehicle for pivotal movement about a longitudinal axis including an engine arranged forwardly of said differential and a transmission driven by the engine and arranged rearwardly of the differential and arranged to drive the differential, and yielding axle sections connected to said power plant on opposite sides of the differential and independently connecting the power plant to said rear wheels.

8. A motor vehicle comprising dirigible front wheels and driven rear wheels, a differential between and drivably connected to said rear wheels, and a power plant mounted on the vehicle for pivotal movement about a longitudinal axis including an engine arranged at one side of said differential and a transmission driven by the engine and arranged at the other side of the differential and arranged to drive the differential, and rigid axle sections yieldably connected to opposite sides of said power plant and on which said rear wheels are journaled and which permit said wheels to move independently of each other.

VICTOR W. KLIESRATH.